United States Patent [19]
Kobayashi

[11] Patent Number: 4,794,849
[45] Date of Patent: Jan. 3, 1989

[54] COUPLING STRUCTURE FOR SHELLS OF BOOSTER

[75] Inventor: Michio Kobayashi, Higashimatsuyama, Japan

[73] Assignee: Jidosha Kiki Co., Ltd., Tokyo, Japan

[21] Appl. No.: 252,553

[22] Filed: Apr. 9, 1981

[30] Foreign Application Priority Data

Apr. 28, 1980 [JP] Japan .............................. 55-58530[U]

[51] Int. Cl.⁴ ......................... F16J 11/02; F16J 3/02; F01B 19/00
[52] U.S. Cl. ..................................... 92/98 D; 92/99; 92/169
[58] Field of Search ............. 91/369 A, 369 B, 376 R; 92/98 R, 98 D, 99, 100, 169

[56] References Cited

U.S. PATENT DOCUMENTS

| | | | |
|---|---|---|---|
| 2,969,046 | 1/1961 | Kellogg et al. | 121/48 |
| 3,053,235 | 9/1962 | Hager | 121/48 |
| 3,109,346 | 11/1963 | Julow | 92/98 |
| 3,146,682 | 9/1964 | Price et al. | 92/99 |
| 3,158,930 | 12/1964 | Wesstrom et al. | 29/510 |
| 3,656,413 | 4/1972 | Eggstein | 92/98 |
| 4,296,680 | 10/1981 | Ohta et al. | 92/98 |

*Primary Examiner*—Paul E. Maslousky
*Attorney, Agent, or Firm*—Flynn, Thiel, Boutell & Tanis

[57] ABSTRACT

A first shell in a booster enclosure is substantially cup-shaped, and a second shell is substantially plate-shaped and has an annular groove which opens radially outward. The second shell is fitted inside the first shell. The inner surface of the annular groove and the inner circumference of the first shell clamp an outer circumferential beaded part of a diaphragm. The second shell is prevented from disengagement from the first shell by engaging pawls formed on the first shell. A reinforcing cylindrical or conical portion is formed at the part of the second shell which is brought into contact with the engaging pawls of the first shell. This reinforcing portion improves the rigidity of this part and prevents the deformation of the second shell by the engaging pawls.

10 Claims, 2 Drawing Sheets

COUPLING STRUCTURE FOR SHELLS OF BOOSTER

BACKGROUND OF THE INVENTION

The present invention relates to a booster enclosure comprising a pair of shells which are mutually coupled together and, more particularly, to an improvement in a coupling structure of such a pair of shells.

A booster such as a brake booster or a clutch booster incorporates a housing comprising a pair of shells which are coupled to each other. A conventional coupling structure of this type is known in which a front shell is cup-shaped overall and a rear shell is plate-shaped; the rear shell fits inside the front shell; engaging pawls of the front shell prevent the rear shell from dropping off; and an annular groove which opens radially outwardly on a portion of the outer circumference of the rear shell and a matching portion of the inner circumference of the front shell clamp an outer circumferential beaded part of a diaphragm. Since the diameter of the coupling parts of the front shell and the rear shell need not be made larger than that of the other parts with such a coupling structure, the diameter of the coupling structure may advantageously be reduced. However, the outer circumferential rim of the rear shell contiguous with the annular groove of the rear shell and in contact with the engaging pawls of the front shell has conventionally been a flat annular rim extending in the radial direction. For this reason, when the thickness of the shell is reduced to reduce the overall weight of the booster, this rim is bent inward by the force acting on it when the brake force is exerted, resulting in incomplete coupling of the two shells and incomplete sealing of the diaphragm.

In order to solve this problem, a reinforcing plate may be spot-welded to the above-mentioned outer circumferential rim of the rear shell. However, the attachment of the reinforcing plate by welding counteracts the weight-reducing effect obtained by reduction of the thickness of the shell and also adds an extra manufacturing step.

BRIEF SUMMARY OF THE INVENTION

It is, therefore, an object of the present invention to provide a booster having a structure which resists the force acting thereupon even when the thickness of the shell is reduced, thereby allowing to a smaller booster weight.

In accordance with the present invention, a construction is used according to which a reinforcing cylindrical or conical portion is formed in a radially extending rim portion of the outer circumference of a rear or second shell which is in contact with engaging pawls of a front or first shell, whereby the rigidity of this part may be improved without requiring welding of a reinforcing plate, the thickness of the shell may be reduced, and a lighter booster may thus be provided.

BRIEF DESCRIPTION OF THE DRAWINGS

The nature, principle and details of the invention will be more clearly apparent from the following detailed description of preferred embodiments of the invention with reference to the accompanying drawings, in which.

DETAILED DESCRIPTION OF THE PREFERRED EMBODIMENTS

The present invention will be described with reference to the preferred embodiments shown in the accompanying drawings. However, a conventional brake booster having a coupling structure of the type described above will first be described.

Figure 1A:
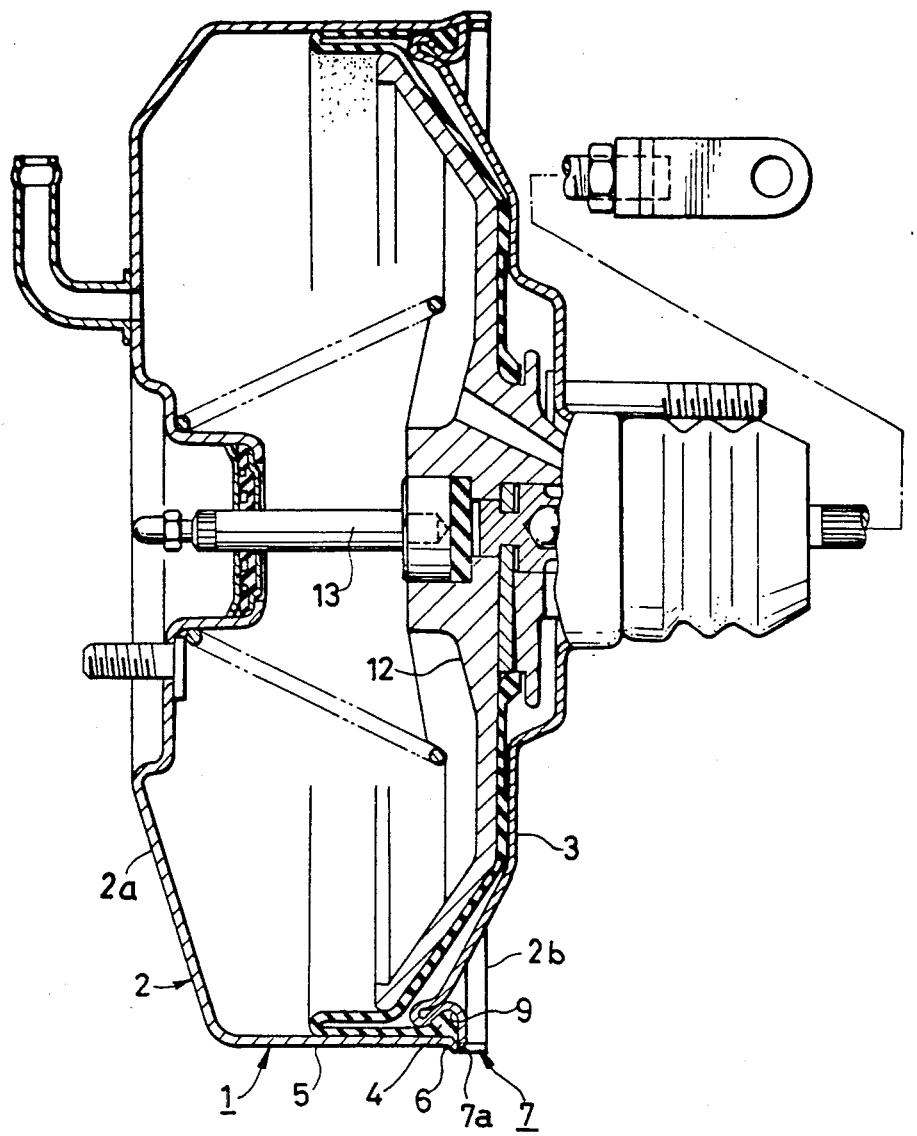
FIG. 1(a) is a longitudinal sectional view of a conventional brake booster.
Figure 1B:
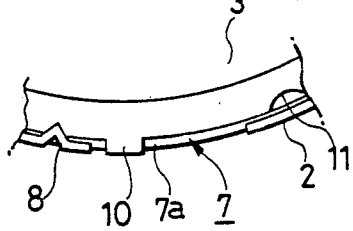
FIG. 1(b) is a side view of the main part of the booster shown in FIG. 1(a)

FIGS. 1(a) and 1(b) show a conventional brake booster 1 having a first shell 2 (a front shell) and a second shell 3 (a rear shell). The outer circumference of a diaphragm 4 housed inside the housing is clamped utilizing coupling parts of the first shell 2 and the second shell 3.

The first shell 2 is substantially pan-shaped and has a closed end 2a. A radially offset step 6 is formed at a cylindrical portion 5 near the open end 2b of the first shell 2. The inner diameter of the portion of the cylindrical part 5 nearest the open end of the shell 2 is set to be slightly larger than that at the inner part thereof to thereby form the step 6. Circumferentially elongated grooves 7 are formed at a plurality of equally spaced positions along the circumference of the open end of the first shell 2. A plurality of engaging pawls 8 with parts which extend radially inwardly are formed on circumferential rim portions where the grooves 7 are not formed. The axial distance between the bottom face 7a of the groove 7 and the axially inner face of the engaging pawl 8 corresponds to the thickness of the second shell 3 to be described in more detail hereinafter.

The second shell 3 is substantially disk-shaped. An annular groove defining portion which defines an annular groove 9 opening radially outwardly for engagement with the outer circumferential enlarged edge of the diaphragm 4 is formed on the second shell 3. The groove-defining portion adjoins a rim portion which is radially outward of the groove-defining portion 9. The diameter at the peripheral edge of the rim portion of the second shell 3 corresponds to the inner diameter of the large diameter part of the cylindrical portion 5 behind the step 6 formed on the first shell 2. Radial projections 10 which engage the above-described elongated grooves 7 and which allow relative rotation of the first shell 2 and the second shell 3 through a predetermined angle are formed at regular intervals on the outer circumferential edge of the second shell 3. Notches or rounded grooves 11 are further formed in the peripheral edge and rim portion of the second shell 3 for allowing the passage of the engaging pawls 8 formed on the first shell 2 when the second shell 3 is fitted with the first shell 2 under the condition that one of each of the radially outwardly extending projections 10 is aligned with one of the elongated grooves 7 in the circumferential direction.

According to the above construction, in order to couple the first shell 2 with the second shell 3, the enlarged, outer circumferential edge of the diaphragm 4 is fitted in the annular groove of the groove defining portion 9 of the second shell 3 and clamped therein by the inner face of the cylindrical portion 5 of the first shell 2.

Next, the second shell 3 is fitted inside the first shell 2 under the condition that one of each of the radial projections 10 formed on the second shell 3 is aligned with a respective one of each of the elongated grooves 7 in the first shell 2, and also under the condition that the notches 11 of the second shell 3 are axially aligned with the engaging pawls 8 of the first shell 2. When the projections 10 of the second shell 3 are brought into contact with the bottom faces 7a of each of the grooves 7 of the first shell 2, the shells 2 and 3 are rotated relative to each other until the leading edges (in the circumferential direction) of each of the projections 10 are brought into contact with respective circumferential ends of each of the elongated grooves 7. Under this condition, the rim portion of the second shell 3 is clamped between the grooves 7 of the first shell 2 and the engaging pawls 8. The outer circumference of the diaphragm 4 is clamped between the inner circumference of the first shell 2 and the inner surface of the annular groove-defining portion 9 of the second shell 3, thereby maintaining a hermetically-sealed condition.

During the operation of the conventional booster of the construction described above, a force towards the front is exerted on a master cylinder (not shown) and the first shell 2 connected thereto by the forward advance of a power wall 12 and a push rod 13 relative to the second shell 3 fixed to an automobile body. The force acting on the first shell 2 is received by the outer circumference of the second shell 3 through the engaging pawls 8 formed in the first shell 2. For this reason, particularly under a high load, great forces in opposite directions are exerted between the engaging pawls 8 of the first shell 2 and the outer circumferential edge of the second shell 3. Thus, when the thicknesses of the shells 2 and 3 are reduced for the purpose of reducing the overall weight of the booster, the outer circumferential edge of the first shell 2 is bent inward by the force exerted thereupon, resulting in incomplete coupling.

Figure 2:
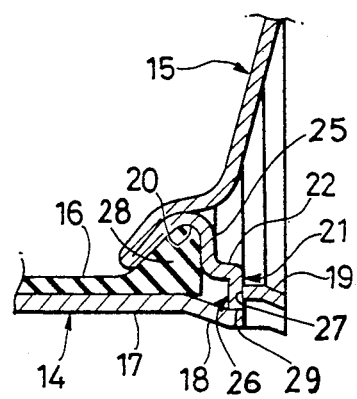
FIG. 2 is a longitudinal sectional view of the main part of a booster according to an embodiment of the present invention.

An embodiment of the present invention will now be described with reference to FIG. 2, wherein reference numeral 14 denotes a first shell of the brake booster; 15, a second shell; and 16, a diaphragm having an enlarged circumferential edge 28. The first shell 14 has a cylindrical portion 17, a sloping step 18, engaging pawls 19, and elongated grooves (not shown). The construction of the first shell 14 is substantially the same as that shown in FIGS. 1a and 1b and described above. The second shell 15 has has an annular groove-defining portion 20, an outer circumferential rim or rim portion 21 which adjoins the groove-defining portion 20 and extends in the radial direction, and radial projections formed on said rim 21 (not shown). Although the construction of the second shell 15 is otherwise the same as that shown in FIGS. 1a and 1b and described above, in this embodiment, a reinforcing cylindrical portion 22 is additionally formed axially offset from the groove-defining portion 20 near the first shell 14, that is, in the middle of the outer circumferential rim 21, making said rim 21 substantially Z-shaped in cross section as shown in FIG. 2, whereby said rim 21 is divided into two parallel radially extending segments. These segments are preferably equal in radial width, as shown in FIG. 2. The radially outermost one of such segments comprises a peripheral edge portion 26. The radially innermost one of these segments comprises a radially extending portion 25 of the rim or rim portion 21. The reinforcing portion 22 is intermediate the radially extending portion 25 and the peripheral edge portion 26, and extends from a radially outermost end of the radially extending portion 25 away from the closed end of the first shell 14. The annular groove defining portion 20 extends radially outwardly and into the open end of the first shell 14 from the radially innermost end of the radially extending portion 25. Such a Z-shaped rim structure can also be adopted when the reinforcing portion is conical rather than cylindrical, as described below. The peripheral edge portion 26 is free of contact with the circumferential enlarged edge 28 of the diaphragm 16, and the radially extending portion 25 contacts the enlarged edge 28. The peripheral edge 29 of the peripheral edge portion 26 is in close fitting contact with the open end of the first shell 14.

In accordance with this embodiment of the present invention, the inward deformation of the outer circumferential rim 21 which might otherwise be caused by the force acting between the outer circumferential rim 21 and the ends 27 of the engaging pawls 19 in contact with said rim 21 during the operation of the brake booster may be prevented by the reinforcing cylindrical portion 22 of the outer circumferential rim 21 so that the thickness of the shells may be decreased and the brake booster may be made lighter as compared with conventional brake boosters.

Figure 3:
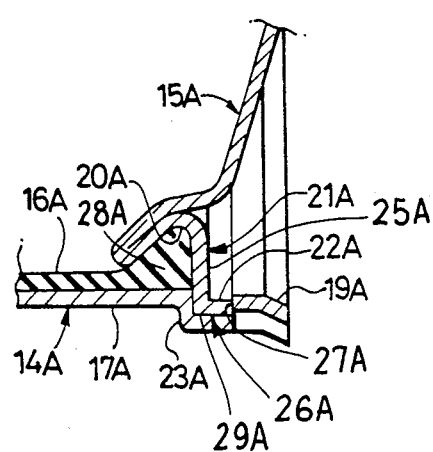
FIGS. 3 and 4 are longitudinal sectional views of the main parts of boosters according to two additional embodiments respectively of the present invention.

In another embodiment of the present invention shown in FIG. 3, a reinforcing cylindrical portion 22A is formed at the distal end of an outer circumferential rim 21A, unlike the case of the above embodiment wherein the reinforcing cylindrical portion 22 was incorporated at the middle of the outer circumferential rim 21. The radially extending portion 25A of the rim portion 21A contacts the diaphragm 16A. The peripheral edge portion 26A is defined by the reinforcing portion 22A and is the peripheral edge 29A of the rim portion 21A. Furthermore, in this embodiment, a radial annular step 23A is formed on the cylindrical part 17A in place of the sloping step 18, and the reinforcing cylindrical portion 22A is interposed between and in contact with the step 23A and the axially inner ends 27A of the engaging pawls 19A.

It is apparent that the same effects may be obtained according to this embodiment as with the former embodiment. The force caused by the pressure difference between the outer atmospheric pressure and the vacuum in the shells when the booster is in the inoperative condition, which is usually received entirely by the projections 10 and the bottom end faces 7a of the circumferentially elongated grooves 7, may be partially or entirely received by the larger area of the step 23A and the inner end face of the outer circumferential rim 21A, according to this embodiment, resulting in a particularly improved structure. It is, however, to be understood that this construction may also be adopted in the embodiment shown in FIG. 2.

Figure 4:
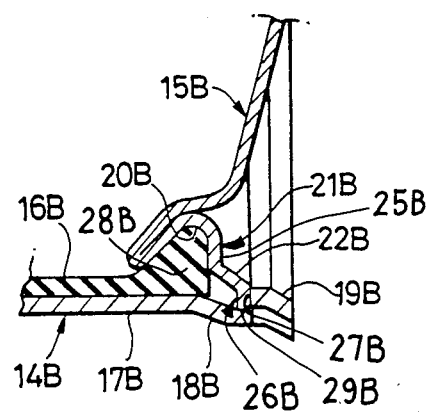

The reinforcing cylindrical portions 22 and 22A need not extend along the axial direction of the booster, but instead may be of conical shape, particularly one inclined 45° with respect to the axial direction, as shown by a reinforcing conical portion 22B in FIG. 4. Parts in FIG. 3 which are the same or similar to parts in FIG. 2 are denoted by the same reference numbers with the letter A added thereto, and similarly such parts in FIG. 4 are denoted by the same reference numbers with the letter B added thereto. The conical portion 22B tapers radially inwardly from the radially outermost end thereof.

Although the present invention has been described in connection with preferred embodiments thereof, many variations and modifications will be apparent to those skilled in the art. It is preferred, therefore, that the present invention be limited not by the specific disclosure herein, but only by the appended claims.

What is claimed is:

1. In a booster enclosure including: a first shell which is pan-shaped and has a closed end, an open end, a cylindrical portion adjoining said open end, and a plurality of circumferentially spaced, radially-inwardly extending pawls formed along the periphery of said open end of said first shell; a second shell having a rim portion comprising a radially outermost peripheral edge portion fitted into said open end of said first shell, a radially extending portion and an annular groove defining portion contiguous with said radially extending portion at a radially innermost end of said radially extending portion, which annular groove defining portion extends into said open end of said first shell and also extends radially outwardly from said radially innermost end of said radially extending portion so as to define in combination with said radially extending portion a radially outwardly opening annular groove, said second shell being adapted to be locked with said first shell by means of said pawls which extend over said rim portion of said second shell when said shells are locked together; and a diaphragm having a circumferential enlarged edge, which enlarged edge is adapted to be clamped between an inner face of said cylindrical portion of said first shell and said annular groove of said second shell, the improvement comprising wherein said rim portion further includes a reinforcing portion intermediate said radially extending portion and said peripheral edge portion, which reinforcing portion extends from a radially outermost end of said radially extending portion away from the closed end of said first shell and is located radially outwardly of and axially offset from said annular groove, and said reinforcing portion is in close proximity to ends of said pawls which are in contact with said rim portion when said shells are locked together, such that said reinforcing portion reinforces said rim portion against stress caused by contact of said rim portion with said pawls.

2. A booster enclosure according to claim 1, wherein said reinforcing portion is cylindrical.

3. A booster enclosure according to claim 1, wherein said reinforcing portion is conical.

4. A booster enclosure according to claim 1, wherein said reinforcing portion defines a peripheral edge of said rim portion, such that said peripheral edge portion is said peripheral edge.

5. A booster enclosure according to claim 1, wherein said reinforcing portion is cylindrical and defines a peripheral edge of said rim portion, such that said peripheral edge portion is said peripheral edge, and said cylindrical portion of said first shell has a radially extending annular step formed on the inside thereof at a position axially inwardly of said pawls, such that said reinforcing portion is in direct contact with and clamped between ends of said pawls and said annular step.

6. A booster enclosure according to claim 1, wherein said reinforcing portion divides said rim portion into two parallel inner and outer radially extending segments, the outer radially extending segment being said peripheral edge portion and the inner radially extending segment being said radially extending portion.

7. A booster enclosure as claimed in claim 6, wherein said inner segment is in direct contact with said enlarged edge of said diaphragm, and said outer segment is free of contact with said diaphragm.

8. A booster enclosure as claimed in claim 3, wherein said conical reinforcing portion tapers towards the closed end of said first shell from the radially outermost end thereof.

9. A booster enclosure comprising
a first shell which is open at one end and closed at the other end thereof, said first shell having a cylindrical portion adjoining said open end and a plurality of circumferentially spaced apart, radially inwardly extending pawls formed on a rim of said first shell defining said open end thereof, said open end of said first shell which includes said pawls also being formed with a circumferentially elongated groove;
a second shell having a rim portion comprising a radially outermost peripheral edge portion of a size adapted for insertion into and close fitting contact within said open end of said first shell, a radially extending portion, an annular groove defining portion contiguous with said radially extending portion at a radially innermost end of said radially extending portion, which annular groove defining portion extends into said open end of said first shell and also extends radially outwardly from said radially innermost end of said radially extending portion so as to define in combination with said radially extending portion a radially outwardly opening annular groove, and a reinforcing portion which extends from a radially outermost end of said radially extending portion away from the closed end of said first shell and is located radially outwardly of and axially offset from said annular groove, said second shell also having a plurality of circumferentially spaced apart, radially outwardly opening grooves formed in said rim portion, said grooves being alignable with said pawls such that said second shell can be fitted to and locked with said first shell by aligning said grooves with said pawls thereby causing said pawls to pass through said grooves as said second shell is inserted into said first shell, and said peripheral edge portion of said second shell is formed with a radially outwardly extending projection aligned with said elongated groove of said first shell such that said projection is inserted by axial movement into said elongated groove when said first and second shells are fitted together and moves arcuately along the circumferential length of said elongated groove when said first and second shells are rotated relative to one another, while at the same time said pawls are moved by such rotation so that they extend over said rim portion, and thereby lock together said shells, ends of said pawls which are in contact with said rim portion being in close proximity to said reinforcing portion such that said reinforcing portion reinforces said rim portion against stress caused by contact of said rim portion with said pawls; and
a diaphragm having a circumferential enlarged edge, which enlarged edge is adapted to be clamped between an inner face of said cylindrical portion of said first shell and said annular groove of said second shell when said shells are locked together.

10. A booster enclosure as claimed in claim 6, wherein said parallel inner and outer radially extending segments of said rim portion are approximately equal in radial width.

* * * * *